(12) United States Patent
Dragone et al.

(10) Patent No.: US 10,719,454 B2
(45) Date of Patent: Jul. 21, 2020

(54) SYNCHRONIZING REQUESTS TO ACCESS COMPUTING RESOURCES

(71) Applicant: International Business Machines Corporation, Armonk, NY (US)

(72) Inventors: Silvio Dragone, Winterthur (CH); Nihad Hadzic, Wappingers Falls, NY (US); William Santiago Fernandez, Poughkeepsie, NY (US); Tamas Visegrady, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 15/804,208

(22) Filed: Nov. 6, 2017

(65) Prior Publication Data

US 2018/0314650 A1   Nov. 1, 2018

Related U.S. Application Data

(63) Continuation of application No. 15/581,796, filed on Apr. 28, 2017.

(51) Int. Cl.
   *G06F 12/14*   (2006.01)
   *G06F 21/62*   (2013.01)
   (Continued)

(52) U.S. Cl.
   CPC .......... *G06F 12/1408* (2013.01); *G06F 21/57* (2013.01); *G06F 21/602* (2013.01);
   (Continued)

(58) Field of Classification Search
   CPC .... G06F 12/1408; G06F 21/57; G06F 21/602; G06F 21/6218; G06F 21/72;
   (Continued)

(56) References Cited

U.S. PATENT DOCUMENTS 5,057,996 A   10/1991   Cutler et al.
5,327,553 A    7/1994   Jewett et al.
(Continued)

OTHER PUBLICATIONS

Köppel, et al. "Analysis of a Hardware Security Module's High-Availability Setting," May 31, 2013, vol. 11, Issue 3, pp. 77-80, http://ieeexplore.ieee.org/document/6522278/.
(Continued)

*Primary Examiner* — Michael Pyzocha
*Assistant Examiner* — Zoha Piyadehghibi Tafaghodi
(74) *Attorney, Agent, or Firm* — Cantor Colburn LLP; Steven Chiu

(57) ABSTRACT

A method includes determining, by a tracker controller of a hardware security module, that a first processor has submitted a first request to access a computing resource. The method also includes determining, by the tracker controller, whether the first request and a second request both request access to the same computing resource. The second request is submitted by a second processor. The method also includes preventing access to the computing resource based on a determination that the first request and the second request do not request access to the same computing resource. The method also includes permitting access to the computing resource based on a determination that the first request and the second request both request access to the same computing resource.

5 Claims, 5 Drawing Sheets

(51) Int. Cl.
*G06F 21/60* (2013.01)
*G06F 21/72* (2013.01)
*G06F 21/57* (2013.01)

(52) U.S. Cl.
CPC .......... *G06F 21/6218* (2013.01); *G06F 21/72* (2013.01); *G06F 2212/1052* (2013.01); *G06F 2221/034* (2013.01); *G06F 2221/2141* (2013.01)

(58) Field of Classification Search
CPC ....... G06F 2212/1052; G06F 2221/034; G06F 2221/2141
See application file for complete search history.

(56) References Cited

U.S. PATENT DOCUMENTS

| | | | |
|---|---|---|---|
| 5,784,630 | A | 7/1998 | Saito |
| 5,914,902 | A | 6/1999 | Lawrence |
| 7,085,386 | B2 | 8/2006 | Audebert et al. |
| 7,181,576 | B2 | 2/2007 | Gammel |
| 7,921,234 | B2 | 4/2011 | Condorelli et al. |
| 8,027,665 | B2 | 9/2011 | Frank |
| 8,375,219 | B2 | 2/2013 | Westerinen et al. |
| 8,631,058 | B2 | 1/2014 | Dragone |
| 8,631,247 | B2 | 1/2014 | O'Loughlin et al. |
| 9,413,730 | B1 | 8/2016 | Narayan et al. |
| 9,424,421 | B2 | 8/2016 | Aissi et al. |
| 9,467,292 | B2 | 10/2016 | Nahari |
| 2007/0171754 | A1 | 7/2007 | Nam |
| 2007/0180228 | A1 | 8/2007 | Mattsson |
| 2008/0022362 | A1 | 1/2008 | Hinton et al. |
| 2009/0288150 | A1* | 11/2009 | Toomim .............. G06F 21/6218 726/5 |
| 2011/0010720 | A1 | 1/2011 | Smith et al. |
| 2011/0247046 | A1* | 10/2011 | Gross ...................... G06F 21/00 726/1 |
| 2013/0061300 | A1 | 3/2013 | Novak et al. |
| 2014/0025871 | A1 | 1/2014 | Kanai |
| 2014/0330870 | A1* | 11/2014 | Lissack ............... H04L 63/0838 707/783 |
| 2015/0287416 | A1* | 10/2015 | Brands ................. G10L 19/018 704/273 |
| 2015/0358312 | A1 | 12/2015 | Kancharla et al. |
| 2016/0232381 | A1 | 8/2016 | Ju et al. |
| 2018/0314650 | A1* | 11/2018 | Dragone ................. G06F 21/57 |
| 2018/0314840 | A1 | 11/2018 | Dragone |
| 2019/0238333 | A1 | 8/2019 | Grubin et al. |

OTHER PUBLICATIONS

Sehr, et al. "Adapting Software Fault Isolation to Contemporary CPU Architectures," 19th USENIX Security Symposium, USENIX (2010), pp. 1-11.
List of IBM Patents or Patent Applications Treated as Related (Appendix P); Filed Nov. 6, 2017, 2 pages.
Silvio Dragone, et al. "Synchronizing Requests to Access Computing Resources" U.S. Appl. No. 15/581,796, filed Apr. 28, 2017.
Silvio Dragone, et al. "Synchronizing Write Operations" U.S. Appl. No. 15/581,920, filed Apr. 28, 2017.
Silvio Dragone, et al. "Synchronizing Write Operations," U.S. Appl. No. 15/804,130, filed Nov. 6, 2017.

* cited by examiner

SYNCHRONIZING REQUESTS TO ACCESS COMPUTING RESOURCES

DOMESTIC PRIORITY

This application is a continuation of U.S. application Ser. No. 15/581,796, filed Apr. 28, 2017, the contents of which are incorporated by reference herein in its entirety.

BACKGROUND

One or more embodiments relate in general to synchronizing requests to access computing resources. More specifically, one or more embodiments relate to synchronizing requests to access resources when performing cryptographic operations.

Certain types of high-security processing and cryptographic operations cannot be performed at the operating system level because computing at the operating system level may not be sufficiently secure. Rather, the processing and operations are performed at the hardware level by hardware security modules (HSMs), for example. HSMs can be implemented on specific cryptographic hardware products such as, for example, cryptocards.

SUMMARY

According to one or more embodiments, a method includes determining, by a tracker controller of a hardware security module, that a first processor has submitted a first request to access a computing resource. The method also includes determining, by the tracker controller, whether the first request and a second request both request access to the same computing resource. The second request is submitted by a second processor. The method also includes preventing access to the computing resource based on a determination that the first request and the second request do not request access to the same computing resource. The method also includes permitting access to the computing resource based on a determination that the first request and the second request both request access to the same computing resource.

According to one or more embodiments, a computer system includes a memory. The computer system also includes a processor system communicatively coupled to the memory. The processor system is configured to perform a method including determining that a first processor has submitted a first request to access a computing resource. The method also includes determining whether the first request and a second request both request access to the same computing resource. The second request is submitted by a second processor. The method also includes preventing access to the computing resource based on a determination that the first request and the second request do not request access to the same computing resource. The method also includes permitting access to the computing resource based on a determination that the first request and the second request both request access to the same computing resource.

According to one or more embodiments, a computer program product including a computer-readable storage medium is provided. The computer-readable storage medium has program instructions embodied therewith. The program instructions are readable by a processor system to cause the processor system to perform a method. The method includes determining that a first processor has submitted a first request to access a computing resource. The method also includes determining whether the first request and a second request both request access to the same computing resource. The second request is submitted by a second processor. The method also includes preventing access to the computing resource based on a determination that the first request and the second request do not request access to the same computing resource. The method also includes permitting access to the computing resource based on a determination that the first request and the second request both request access to the same computing resource.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
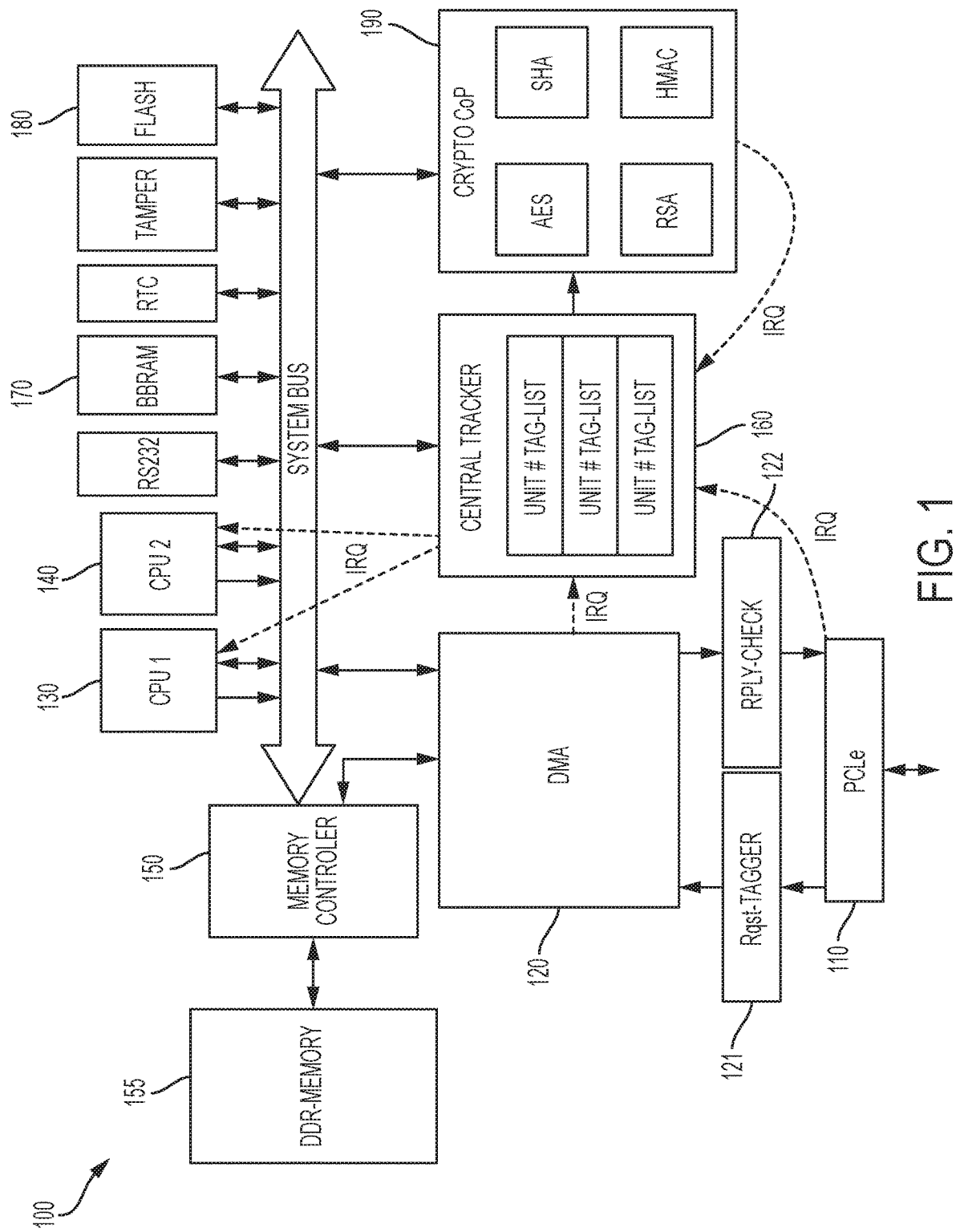
FIG. 1 depicts a computing system in accordance with one or more embodiments of the present invention.

In accordance with one or more embodiments, methods and computer program products for synchronizing requests to access resources are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

The next generation of HSMs will likely be implemented using application-specific integrated circuit (ASIC) components. These ASICs can perform the necessary cryptographic functionality of the HSMs. When performing the cryptographic functionality, the ASICs need to satisfy reliability, availability, and serviceability (RAS) requirements. Specifically, each ASIC can include at least one processor, and each processor needs to satisfy the necessary RAS requirements.

The processor within an ASIC may be customizable by a user. In instances where the processor is not customizable by the user and the processor is not already fully RAS compliant, the user is unable to configure the processor to perform in a manner that satisfies the RAS requirements. However, despite not being able to customize the processor of an HSM to operate in accordance with RAS requirements, the user may still need to ensure that the HSM's overall functionality fulfills the RAS requirements.

In view of the need to ensure that an HSM's overall functionality fulfills RAS requirements, the current approaches typically determine whether the HSM satisfies the requirements based upon whether or not the HSM's processor is performing in a glitch-free manner or is at least consistently detecting glitches. The current approaches determine whether the HSM's processor is performing in a glitch-free manner by comparing the output produced by the HSM's processor with the output produced by another processor. In some cases, the HSM can have two processors (a first processor and a second processor) that both receive the same inputs/requests from a host. Both the first processor and the second processor then perform the received requests from the host. Performing the requests then results in a particular output, and the output from the processors are compared against each other. If both the first processor and the second processor receive the same inputs/requests, then the first processor and the second processor can be considered to operate in parallel/lockstep with each other, and their respective outputs should be the same. The respective outputs from each processor can be compared in order to determine if any error has occurred. If the outputs match, then the first processor and the second processor are considered to have operated in a glitch-free manner. If the outputs do not match, then a glitch has likely occurred in at least one of the processors.

However, the current approaches are often unable to operate the first processor and the second processor in proper lockstep with each other because a processor can only operate in lockstep with another processor if both processors are specifically designed to operate in lockstep. Specifically, two processors are able to operate in lockstep with each other only if the cores of both processors are configured to engage in lockstep performance. If either of the processors is not specifically designed to operate in lockstep, then operating the processors in lockstep will not yield outputs that can be compared, because the processors will inexplicably begin to perform in an asynchronous manner. As such, the outputs of the processors may differ from each other, even in the absence of glitches.

In view of the difficulties of the previous approaches, one or more embodiments of the present invention are directed to a computer-implemented method of verifying that the processors of an HSM are operating properly, even if the output of the processors cannot be compared against each other as a result of the processors not being specifically designed to perform in lockstep. Rather than merely comparing the outputs of processors against each other (as performed by the current approaches), embodiments of the present invention determine that the processors are operating properly by verifying that the processors are requesting access to the same resources, as described in more detail below.

When one or more processors request access to computing resources (i.e., when one or more processors attempt to access resources from a resource base), one or more embodiments of the present invention verify that these resource requests are consistent with each other, in order to ensure that the HSM meets the RAS requirements.

Specifically, one or more embodiments of the present invention configure at least two separate processors to request access to the same resources, in parallel. The two processors can belong to a same HSM, for example. Embodiments of the present invention can utilize hardware-enforced synchronization in order to ensure that a request to access a resource by one processor is also attempted by the other processor. As such, embodiments of the present invention can verify that the access attempts of the processors are consistent with each other. As described in further detail below, one or more embodiments of the present invention can also synchronize interrupts to prevent occurrence of critical disturbance.

FIG. 1 depicts a computing system 100 in accordance with one or more embodiments of the present invention. Computing system 100 can be implemented as a hardware security module. Computing system 100 can receive incoming requests from a host via a bus 110. Bus 110 can be a Peripheral Component Interconnect Express (PCIe) bus, for example. Computing system 100 can also include a request tagger controller 121 that tags each request that is received from the host. The request tagger controller 121 can tag each incoming request with a hash or pseudorandom value. With one or more embodiments of the present invention, each received request is tagged with a unique value that serves as a unique identifier for the received request. For example, one or more embodiments can tag each received request by inserting the identifying value/tag within a header of each received request.

Computing system 100 can also include a direct memory access (DMA) controller 120 that can communicate with at least a first processor 130 and a second processor 140 to process the requests. First processor 130 and second processor 140 can also communicate with memory controller 150 when accessing memory (such as DDR-Memory, for example) 155, battery-backed random-access memory (BBRAM) 170, and/or flash memory 180, for example. DMA controller 120 can receive each tagged request from request tagger controller 121. DMA controller 120 can then transmit each tagged request to memory regions of a first processor 130 and/or a second processor 140.

Both first processor 130 and second processor 140 can be configured to process each tagged request. In order to process certain requests, the first processor 130 and the second 140 will need to access certain internal resources. In other words, the requests received from the host can correspond to one or more requests for internal computing resources. For example, in order to process certain requests relating to cryptographic functions, the processors need to request access to certain hardware-implemented or software-implemented resources that perform the requested cryptographic functionality. The cryptographic functions can be related to, for example, Public Key Algorithms (PKA), Symmetric-Key Cryptography (SKCH), and/or Digital Random Number Generating (DRNG). With one or more embodiments of the present invention, the resources can be implemented on the HSM itself. Computing system 100 can thus perform a variety of cryptographic operations using computing resources 190 such as, for example, Advanced Encryption Standard (AES) resources, RSA resources, Secure Hash Algorithm (SHA) resources, and/or keyed-hash message authentication code (HMAC) resources.

As each processor attempts to access a resource to complete a particular tagged request (that has been received from the host), the processor will transmit the tagged request to central tracker controller 160. For example, if the first processor 130 is attempting to access a cryptographic resource 190 to complete a tagged request, first processor 130 will transmit the tagged request to central tracker controller 160. Central tracker controller 160 can be configured to retrieve the identifying tag/value of the tagged request. Central tracker controller 160 can also be configured to store the identifying tag/value of the received tagged request. Each received identifying tag/value can be stored within a unit tag list, for example. Each unit tag list can correspond to a list of requests for a distinct cryptographic resource. For example, one unit tag list can be a list of requests for the AES resource, and another unit tag list can be a list of requests for the RSA resource.

Once central tracker controller 160 receives the access request from first processor 130, central tracker controller 160 can then determine whether second processor 140 has also attempted to access the same cryptographic resource. Central tracker controller 160 can make this determination based at least on the unit tag list, for example. In one example embodiment of the present invention, central tracker controller 160 can determine whether second processor 140 has requested access to the same resource based upon whether the unit tag list has stored an identifying value/tag (received from second processor 140) that is the same value/tag as the identifying value/tag of the received request (received from first processor 130).

If central tracker controller 160 determines that the unit tag list has not stored any identifying value/tag from second processor 140 that matches the identifying value/tag of the received request (received from first processor 130), then the central tracker controller 160 determines that second processor 140 has not yet requested access to the same resource. As such, central tracker controller 160 can prevent first processor 130 from accessing the resource until the second processor 140 has also requested access to the same resource. Similarly, if second processor 140 attempts to access a resource that first processor 130 has not yet attempted to access, then central tracker controller 160 can prevent second processor 140 from accessing the resource until first processor 130 has also attempted to request the same resource.

In the event that both processors request access to the same resource, the central tracker controller 160 can permit at least one of the first processor 130 and the second processor 140 to access the cryptographic resource 190. In the event that one request is granted, the other non-granted request can be deleted.

As described above, if only one of the processors requests access to a computing resource, then central tracker controller 160 can prevent the processor from accessing the resource until the other processor also requests access to the same resource. One or more embodiments of the present invention can implement a timer that is configured to track how long a processor is prevented from accessing the resource. In other words, the timer is configured to track how long a processor is waiting for the other processor to request access to the same resource. If the timer determines that a processor has waited beyond a threshold duration of time, the timer can be configured to generate an indication that an error has possibly occurred. Because the timer will be triggered to generate an indication after a threshold period of time, one or more embodiments avoid a dead-lock situation from occurring. If the timer has triggered the indication that an error has possibly occurred, one or more embodiments can be configured to compare the internal states of each processor to determine whether or not an error has actually occurred.

As the central tracker 160 permits a computing resource to be accessed, the resource can perform the cryptographic functionality and thus produce a result. The produced results can be provided to both first processor 130 and the second processor 140 at the same time so that the processors can continue to operate in parallel.

Each of the processors can provide separate replies to the host. With one or more embodiments, replies to the host can be checked with a hash comparison. As both processors will produce a separate reply, the replies can be cross-checked against each other. One reply can be supplied to the host, and the other reply can be deleted. In one or more embodiments of the present invention, the reply can be checked using a reply check controller 122.

With one or more embodiments of the present invention, the host can transmit an interrupt to the hardware security module. The host can transmit an interrupt to the hardware security module when the host needs to indicate that an event requires immediate attention, for example. When the host transmits the interrupt to the hardware security module, the interrupt is received by central tracker controller 160 of the hardware security module. With one or more embodiments of the present invention, the central tracker 160 will not begin addressing/processing the received interrupt until existing, outstanding internal requests have been resolved. For example, as described above, if a first processor 130 is attempting to access a resource while awaiting the second processor 140 to attempt to access the same resource, one or more embodiments can consider the attempt to access the resource as an outstanding internal request. Therefore, if a processor is awaiting access to a resource, one or more embodiments will not immediately process/address an external interrupt received from the host. Rather, if the first processor is awaiting access to the resource when an external interrupt is received, central tracker controller 160 can be configured to first either cancel the first processor's resource request and/or prompt the second processor to access the same resource. Central tracker controller 160 can then address/process the interrupt after the internal requests have been resolved.

Figure 2:
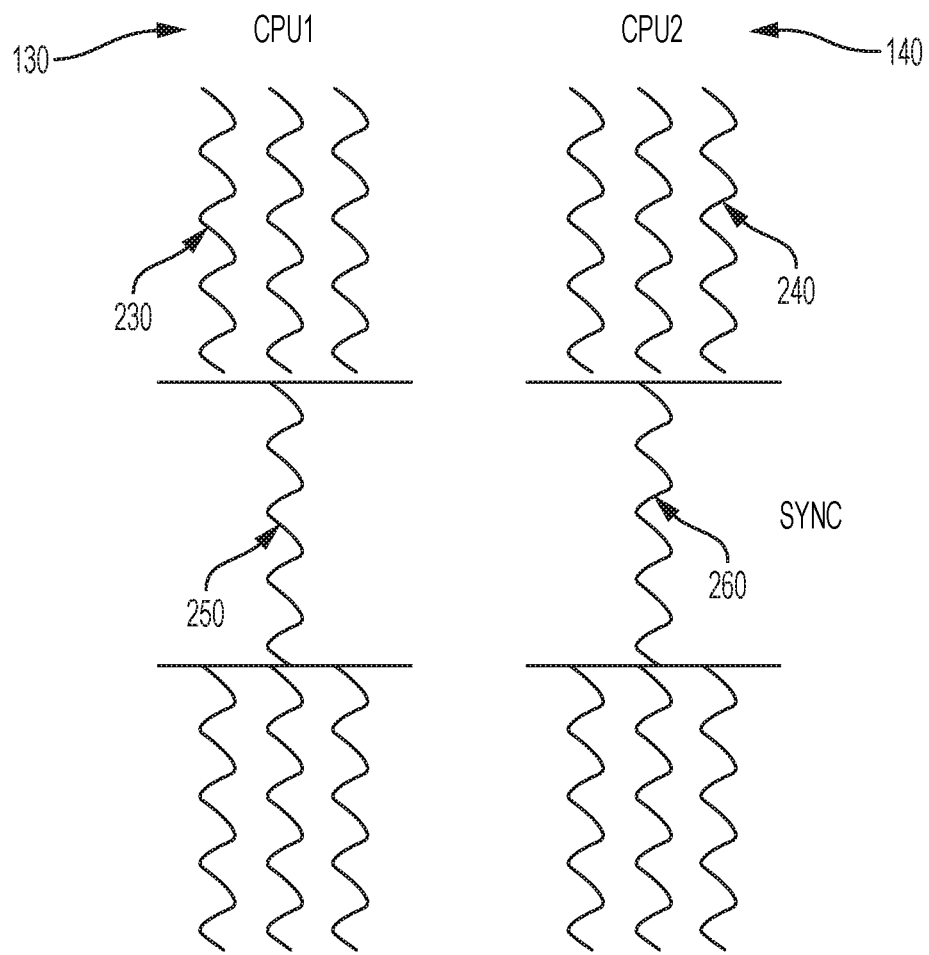
FIG. 2 depicts synchronizing requests to access computing resources in accordance with one or more embodiments of the present invention.

FIG. 2 depicts synchronizing of requests to access resources in accordance with one or more embodiments of the present invention. As shown in FIG. 2, a first processor 130 and a second processor 140 can each be performing a plurality of requests in parallel. First processor 130 is performing requests 230, and second processor 140 is performing requests 240. As described above, requests 230 and requests 240 can be a same set of requests. Suppose first processor 130 is performing a resource request 250 for a cryptographic resource 190. One or more embodiments of the present invention can prevent first processor 130 from accessing the requested resource until second processor 140 also attempts to perform the same resource request. When second processor 140 attempts the resource request (request 260), then one or more embodiments can then synchronize the resource requests and permit at least one of the requests to access the resource.

Figure 3:
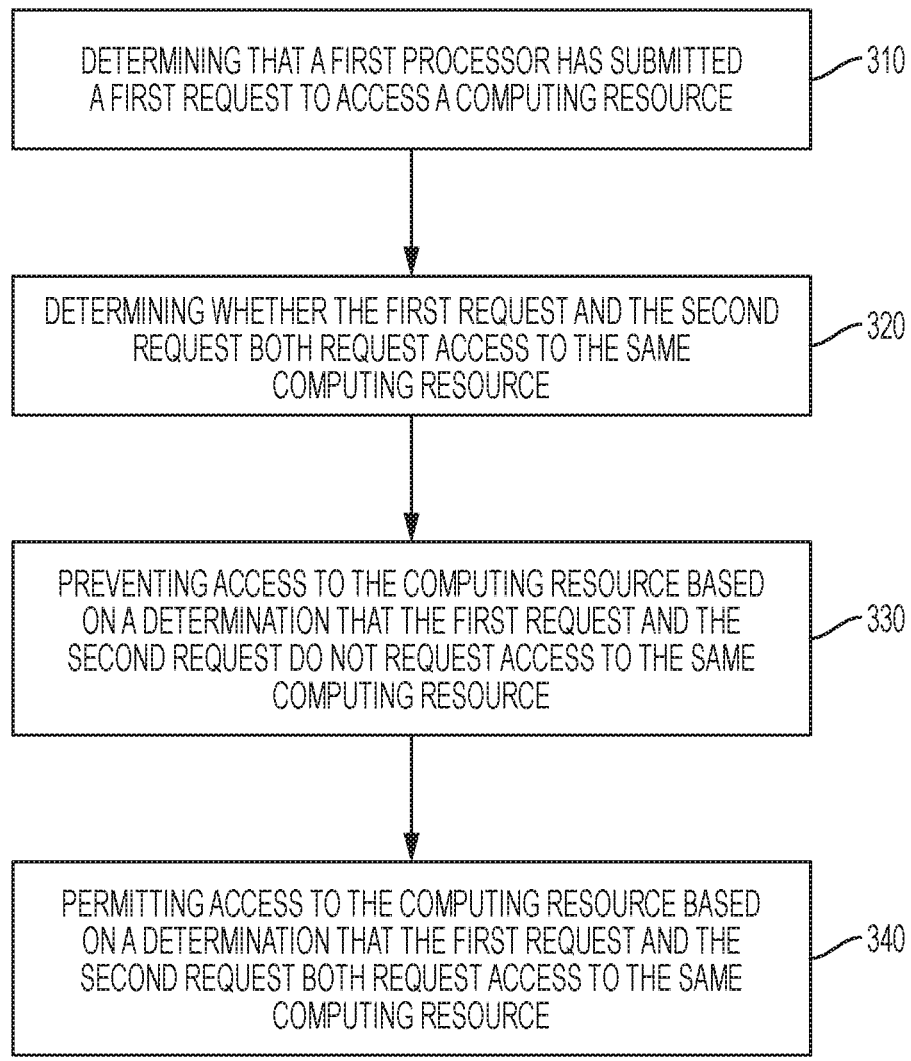
FIG. 3 depicts a flowchart of a method in accordance with one or more embodiments of the present invention.

FIG. 3 depicts a flowchart of a method in accordance with one or more embodiments of the present invention. In one or more embodiments of the present invention, the method can be performed by an HSM, a tracker controller, and/or a DMA controller, for example. The method includes, at block 310, determining that a first processor has submitted a first request to access a computing resource. The method includes, at block 320, determining whether the first request and a second request both request access to the same computing resource. The second request is submitted by a second processor. The method also includes, at block 330, preventing access to the computing resource based on a determination that the first request and the second request do not request access to the same computing resource. The method also includes, at block 340, permitting access to the computing resource based on a determination that the first request and the second request both request access to the same computing resource.

Figure 4:
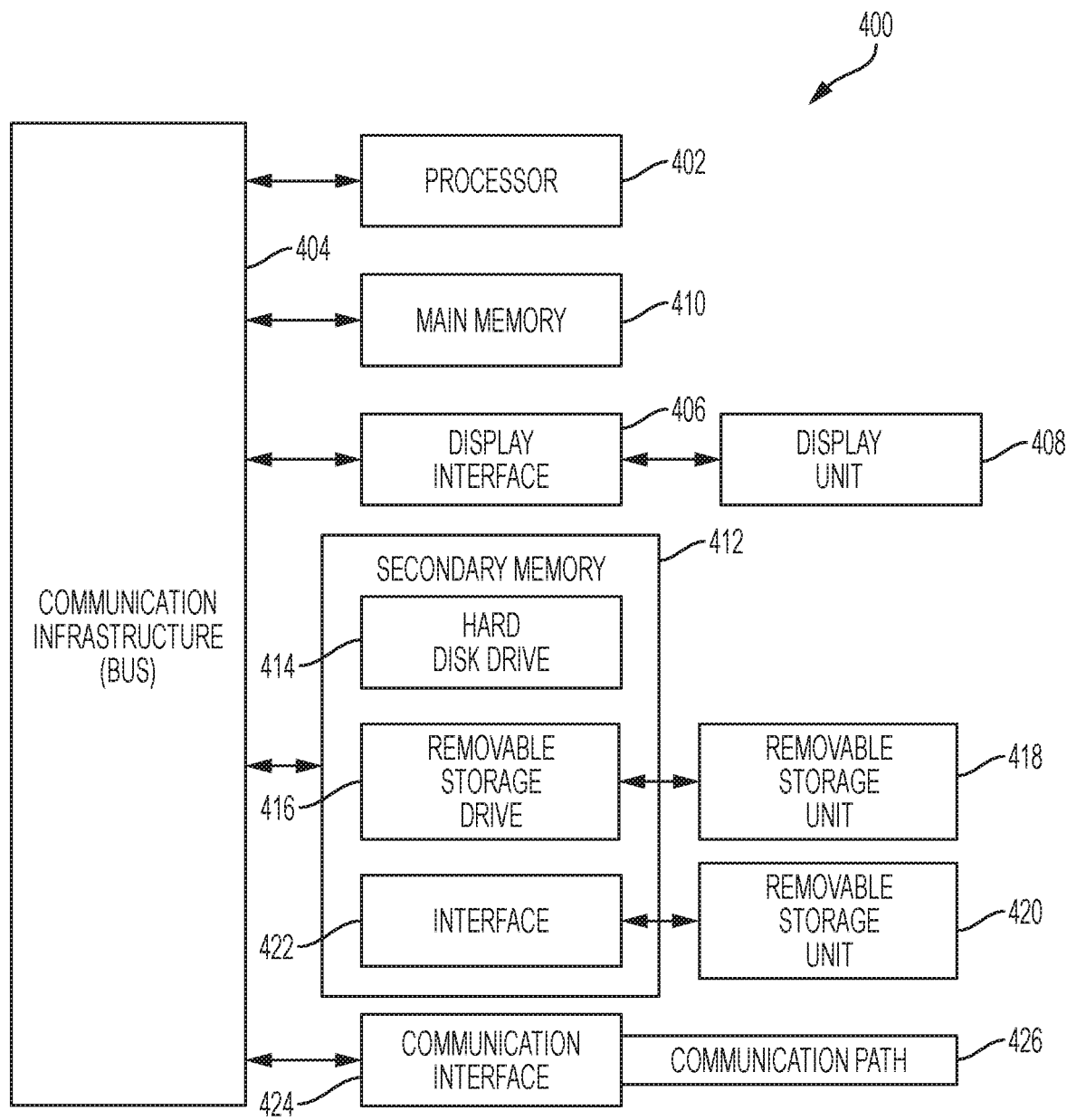
FIG. 4 depicts a high-level block diagram of a computer system, which can be used to implement one or more embodiments of the present invention.

FIG. 4 depicts a high-level block diagram of a computer system 400, which can be used to implement one or more embodiments of the present invention. Computer system 400 can correspond to, at least, a hardware security module, a central tracker controller, and/or a DMA controller, for example. Computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system to perform the features discussed herein. In particular, the computer programs, when run, enable processor 402 to perform the features of the computer system. Accordingly, such computer programs represent controllers of the computer system. Thus it can be seen from the forgoing detailed description that one or more embodiments provide technical benefits and advantages.

Figure 5:
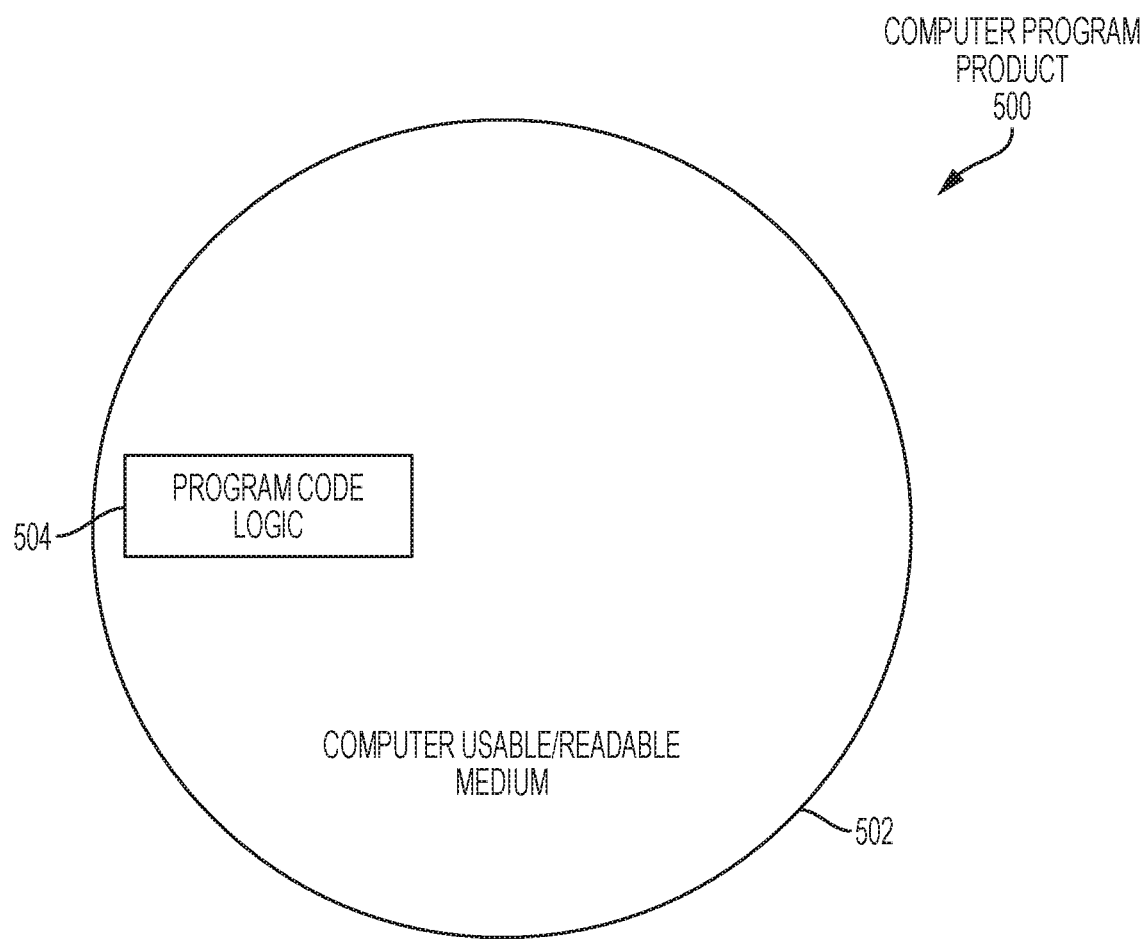
FIG. 5 depicts a computer program product, in accordance with one or more embodiments of the present invention.

FIG. 5 depicts a computer program product 500, in accordance with an embodiment of the present invention. Computer program product 500 includes a computer-readable storage medium 502 and program instructions 504.

Embodiments can be a system, a method, and/or a computer program product. The computer program product can include a computer-readable storage medium (or media)

having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method, the method comprising:
   determining, by a tracker controller of a hardware security module, that a first processor has submitted a first request to access a computing resource;
   determining, by the tracker controller, whether the first request and a second request both request access to the same computing resource, wherein the second request is submitted by a second processor;
   preventing access to the computing resource based on a determination that the first request and the second request do not request access to the same computing resource,
   preventing access to the computing resource based on a determination that the first request and the second request are not performed within a threshold duration of time from one another; and
   permitting access to the computing resource based on a determination that the first request and the second request both request access to the same computing resource and that the first request and the second request are performed within the threshold duration of time from one another,
   wherein the first request corresponds to a first host request, the first request is tagged with a first value, the second request corresponds to a second host request, and the second request is tagged with a second value and wherein determining whether the second processor has submitted the second request to access the same computing resource comprises determining whether the first value is the same as the second value.

2. The computer-implemented method of claim 1, wherein the first request and the second request are requests to access a computing resource that performs cryptographic functions.

3. The computer-implemented method of claim 1, wherein the first processor and the second processor are processors of a hardware security module.

4. The computer-implemented method of claim 1, further comprising storing at least one of the first value and the second value within the tracker controller.

5. The computer-implemented method of claim 1, further comprising prompting the second processor to access the same resource as the first processor's first request after determining that the first processor has submitted the first request.

* * * * *